Figure 1:
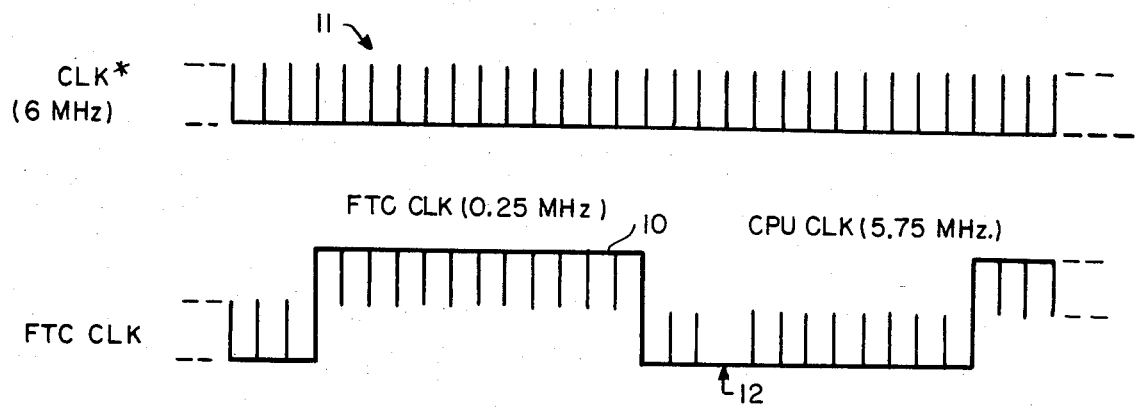

United States Patent [19]

McKenna, Jr.

[11] Patent Number: 4,600,845
[45] Date of Patent: Jul. 15, 1986

[54] FAULT-TOLERANT CLOCK SYSTEM
[75] Inventor: John F. McKenna, Jr., Gloucester, Mass.
[73] Assignee: The Charles Stark Draper Laboratory, Inc., Cambridge, Mass.
[21] Appl. No.: 567,249
[22] Filed: Dec. 30, 1983
[51] Int. Cl.⁴ .................. H03K 5/00; H03K 3/017
[52] U.S. Cl. .................. 307/269; 307/219; 307/511; 307/527; 328/63; 328/155
[58] Field of Search ............... 307/219, 441, 269, 510, 307/511, 516, 527, 528, 514; 328/63, 155

[56] References Cited
U.S. PATENT DOCUMENTS

| | | | |
|---|---|---|---|
| 2,980,858 | 4/1961 | Grondin et al. | 307/527 |
| 3,440,547 | 4/1969 | Houcke | 328/63 |
| 3,671,776 | 6/1972 | Houston | 328/63 |
| 4,309,662 | 1/1982 | Baudoux | 307/528 |
| 4,373,204 | 2/1983 | Brooks | 328/63 |

Primary Examiner—John Zazworsky
Attorney, Agent, or Firm—Robert F. O'Connell

[57] ABSTRACT

A clock generator source, a plurality of which can be used as redundant clock sources in a fault tolerant clock system. The input and output clock signals of said source being formed of a plurality of pulses having a frequency substantially higher than the frequency of the input and output signals, one pulse being omitted in each cycle thereof to form a "dead interval" therein when the input and output signals are in phase. When the output signal is not in phase with the input signal at the start of a cycle the length of the cycle of the output signal is either lengthened or shortened by inserting a second dead interval or omitting the dead interval, respectively, to bring the input and output signals in phase by the end of the cycle.

11 Claims, 3 Drawing Figures

FAULT-TOLERANT CLOCK SYSTEM

INTRODUCTION

This invention relates generally to clock systems for forming digital timing signals and, more particularly, to fault-tolerant systems utilizing a plurality of redundant timing sources for providing correct timing signals despite the failure of one or more clock elements therein.

BACKGROUND OF THE INVENTION

Fault-tolerant clock systems using redundant clock sources are currently available for providing timing signals in the failure of one or more of the individual clock sources therein. Some systems require relatively complex self-testing circuitry while other systems which rely on a majority decision among redundant sources are arranged in ways which could cause erroneous output pulses to be formed. Still other systems utilize the approach of detecting, isolating and correcting faults as they occur, a design which requires the determination of all failure modes prior to design, thereby producing a complex and relatively expensive system.

Other systems require a relatively large number of clock elements to provide tolerance for faults. One such system which has been devised for minimizing the number of redundant clock sources required for tolerating a selected number of clock failures, thereby reducing the cost and complexity of such a system, has been disclosed in U.S. Pat. No. 4,239,982, issued on Dec. 16, 1980 to T. Basil Smith et al. In such system, for example, a selected number, e.g., r, of clock source failures can generally be tolerated while using only (2r+2) redundant clock sources.

In the Smith et al. system the clock generator of each redundant clock source utilizes a variable frequency generated clock signal, the frequency of which is controlled by a voltage controlled oscillator (VCO). The phase of a derived system clock signal is compared with the VCO generated clock signal and the compared output is supplied to a low pass filter which produces a DC voltage for controlling the operation of the voltage controlled oscillator so as to change the frequency of the output thereof until it is in phase with the derived system clock signal. The latter signal is normally determined by a majority (M) of the total number of clock signals from the redundant clock sources.

While such a system works better than previously designed fault-tolerant clock systems, the reliability of VCO clock generated sources is relatively low, while the cost thereof is relatively high.

It is desirable, therefore, to design a fault-tolerant clock system which avoids the use of VCO circuitry and utilizes effective logic circuitry which is both less expensive and more reliable for long term use.

SUMMARY OF THE INVENTION

In accordance with the invention each clock generator in each redundant clock source of a system such as described in the aforesaid Smith et al. patent utilizes circuitry which does not require the use of a voltage controlled oscillator. Each redundant clock source uses a generated clock signal which is derived from a high frequency clock signal, one of the high frequency clock pulses in each generated clock cycle being omitted during the normal clock signal generation process (in effect, forming a "pulse dead space"). If, at the beginning of a clock cycle, the generated clock signal is not in phase with the derived system clock signal (normally determined by a majority (M) of the generated clock signals from all of the redundant clock sources), the phase of the generated clock signal at the end of such cycle is adjusted so as to be in phase with the phase of the derived clock signal at the end of such cycle.

Thus, if the phase of the generated clock signal at the beginning of a clock cycle is "ahead" of the incoming derived majority system clock signal, the overall clock period is increased by one high frequency clock pulse so as to bring the generated clock into alignment with the derived system clock signal at the end of the cycle. On the other hand, if the beginning of a generated clock signal is "behind" the derived system clock signal, the overall generated clock period is shortened by one high frequency clock pulse and the "pulse dead space" is deleted so that the generated clock signal becomes phase aligned at the end of the cycle with the derived system clock signal.

BRIEF DESCRIPTION OF THE INVENTION

Figure 2:
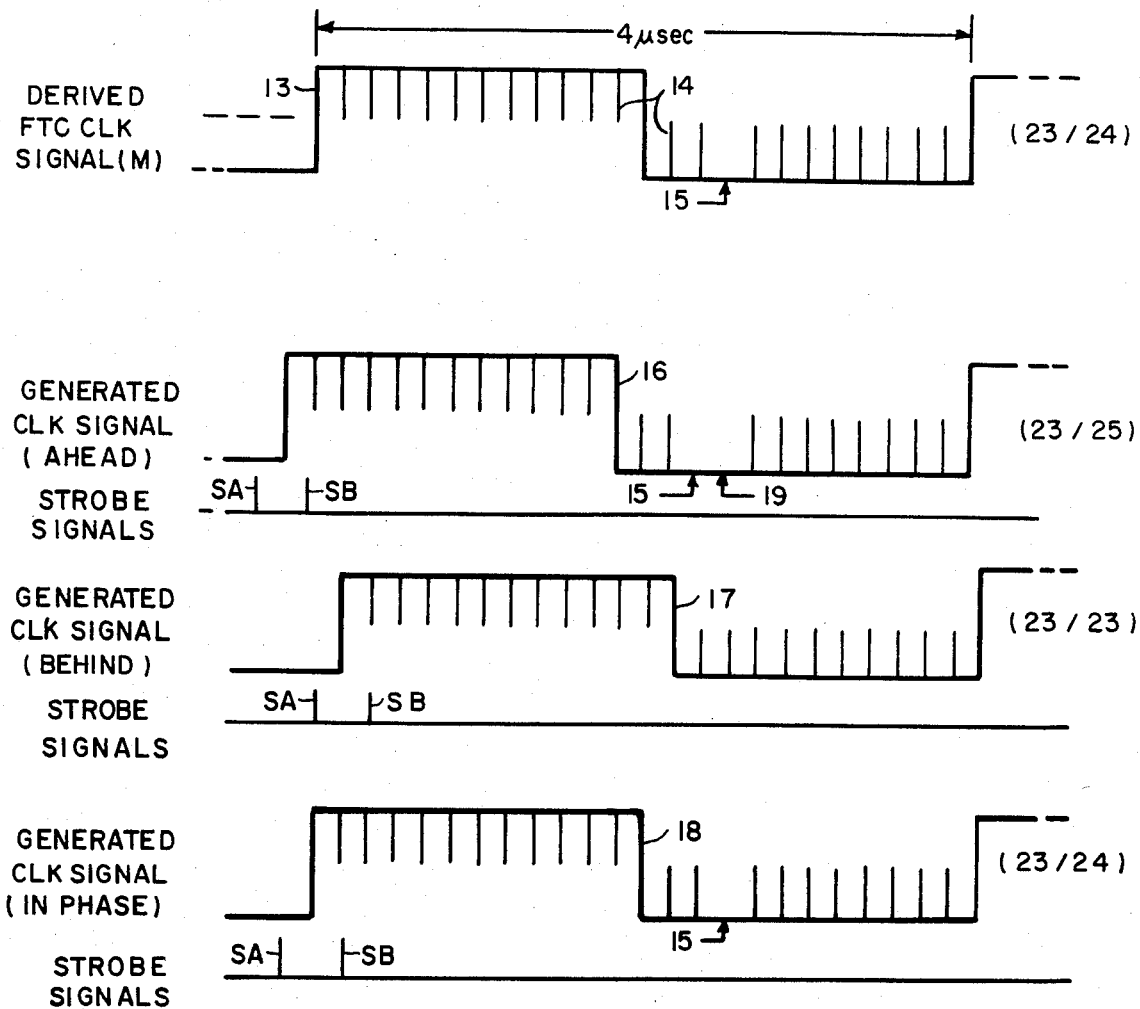
Figure 3:
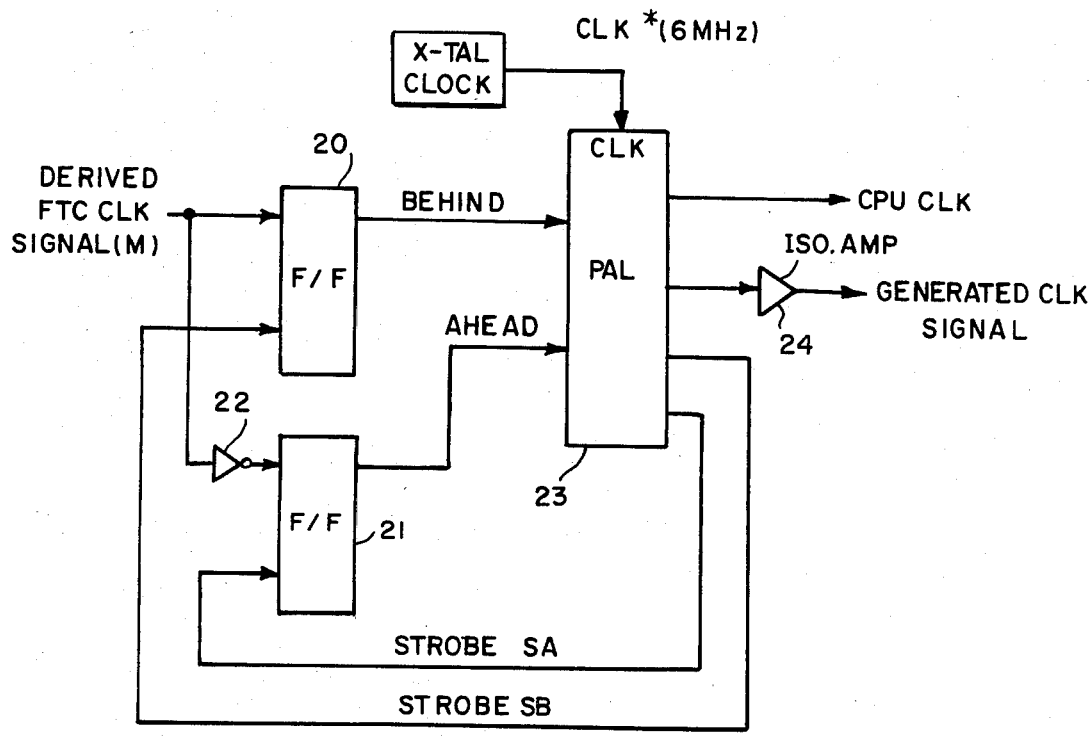

The invention can be described in more detail with reference to the drawings wherein FIG. 1 discloses a timing diagram which depicts a desired derived fault-tolerant clock signal;

FIG. 2 shows a further timing diagram which depicts the adjustment of a generated clock signal when it is out of phase with a desired fault-tolerant clock signal; and FIG. 3 depicts a circuit diagram for use in producing an adjusted generated clock signal when it is not in phase with the desired derived fault-tolerant clock signal.

The circuitry of the invention can be best described the help of the timing diagrams of FIGS. 1 and 2.

As can be seen in FIG. 1, an exemplary fault-tolerant clock (FTC) signal 10 has a desired frequency, e.g., of 0.25 MHz. Such signal is derived from an exemplary high frequency clock signal (CLK*) 11 having a frequency of 6 MHz. Thus, a single cycle of the fault-tolerant clock signal 10 in the particular embodiment disclosed would normally be made up of 24 pulses of the clock signal 11. However, in accordance with the technique of the invention, the fault-tolerant clock signal 10 is made up of 23 pulses of the clock signal 11, one pulse signal being omitted at an arbitrarily selected location (other than at the end of the FTC clock. cycle) e.g., at the pulse position 12 as shown. The pulse repetition rate, or effective frequency, of the pulses which form FTC clock signal 10 is 23/24 of the frequency of CLK* signal 11 (i.e., 5.75 MHz) The presence of a deleted clock pulse, i.e., the "dead" interval, permits a ready adjustment of a generated clock signal in each redundant clock source, as discussed in more detail below.

As mentioned above, each clock source of the redundant clock system, as shown in an exemplary system of the aforesaid Smith et al. patent, responds to a derived FTC clock signal obtained, for example, as a "majority" of the generated clock signals from each clock source (as shown, for example, in FIG. 1 of the patent) and produces a generated clock signal which is in phase with such majority FTC clock signal. Exemplary VCO circuitry for providing such in-phase generated clock signal is depicted in, and discussed with reference to, FIG. 3 of the Smith et al. patent.

In contrast, the circuitry of the invention does not require such a VCO circuit for producing such clock generated signal, as best understood by considering the timing diagram of FIG. 2 herein. As can be seen therein, a derived FTC clock signal 13, normally obtained from voter circuitry which provides a signal representing the majority (M) of the redundant generated clock signals, has a selected frequency. In the particular embodiment being described an exemplary FTC clock signal has a frequency of 0.25 MHz, the clock period, or cycle, of which is 4 microseconds ($\mu$sec), as shown in FIG. 2. Such derived FTC clock signal 13 is made up of 23 high frequency (CPU) pulses 14 of a 6 MHz signal, there being one deleted pulse at pulse dead interval 15. Accordingly, in each FTC clock cycle there are 23 out of 24 possible CPU clock pulses as shown. At the beginning of a clock cycle, a generated clock signal from a particular clock source may be either one or more CPU clock cycles ahead of the derived FTC clock signal (as shown by generated clock signal 16), or one or more CPU clock cycles behind the derived FTC clock signal (as shown by generated clock signal 17), or it may be in phase with the derived FTC clock signal (as shown by generated clock signal 18). As used herein, the generated clock signal is considered as essentially "in phase" with the derived FTC clock signal if it is within one CLK* pulse of the derived FTC clock signal. A comparison of the phase relationship at the beginning of each clock cycle can be made in a particular embodiment of the invention by utilizing a pair of strobe signals SA and SB (generated as discussed in more detail with reference to FIG. 3) to determine whether the generated clock signal is ahead, behind, or in phase with the derived FTC clock signal.

As can be seen in FIG. 2, if the generated clock signal is ahead of the FTC clock signal (as in signal 16), the generated clock cycle is lengthened by one CPU clock pulse so as to maintain registration, or alignment, with the FTC clock signal by the end of the clock cycle as shown in FIG. 2. The generated clock signal then comprises 23 pulses out of 25 pulse positions in its overall clock period for such a "clock ahead" situation (i.e., an additional "dead" interval is provided therein).

If the generated clock signal is behind the FTC clock signal (as in signal 17), the generated clock signal is adjusted by shortening the clock cycle period by one CPU clock pulse width and omitting the deleted pulse (i.e., omitting the "dead" interval) as shown in FIG. 2. In this case the generated clock signal is made up of 23 pulses out of 23 pulse positions.

If the generated clock signal is in phase with the derived FTC clock signal no adjustment is made of the generated clock signal period and the generated clock output is provided with the normal 23 clock pulses out of 24 pulse positions as shown.

One particular implementation of circuitry for providing the lengthening or shortening operation for the generated clock signal when the generated clock signal is not in phase with the derived FTC clock signal at the beginning of a clock period is shown in the specific circuit embodiment of FIG. 3. Although not limited thereto, the circuitry of FIG. 3 can be used as the clock generator circuit in the context of a fault-tolerant clock system such as that shown in FIG. 1 of the aforesaid Smith et al. U.S. Pat. No. 4,239,982, such patent being incorporated by reference herein to show its use in such an exemplary context. It will be clear to those in the art that the technique disclosed herein can be readily adaptable for use in other fault-tolerant clock systems.

As seen in FIG. 3 herein, the derived FTC clock signal which, for example, represents the majority (M) of the generated clock signals from all of the redundant clock sources is supplied to a pair of flip-flop circuits 20 and 21, the FTC clock signal being supplied directly to flip-flop 20 and through an inverter amplifier 22 to flip-flop 21. The other inputs of flip-flops 20 and 21 are strobe signals SB and SA, respectively, which define a selected time interval and which strobe the flip-flops both before and after the generated clock signal (as shown in each case in FIG. 2) which permits a determination to be made (as discussed below) as to whether the generated clock signal is ahead of, behind, or in phase with the FTC clock signal. Thus, the selected time interval defined when the flip-flops are strobed represents one CLK* clock pulse width before and after, respectively, the beginning of the generated clock signal, as depicted by the pulses SA and SB associated with the generated clock signals in each of the cases shown in FIG. 2. If the majority input (M) signal is still low at the end of such time period, i.e., one CLK* pulse width (i.e., 1/6 $\mu$sec) after the generated clock signal has gone high and begun its cycle, then the generated clock signal is determined to be ahead of the derived FTC clock signal (M) thereby producing an "ahead" control signal from flip-flop 21. Such control signal is supplied to a programmable array logic (PAL) circuit 23 which has been programmed to respond thereto so as to provide a generated clock signal which is lengthened by one CLK* pulse period and in which an additional dead interval 19 is inserted, as shown by signal 16 of FIG. 2. The generated clock signal output of the PAL 23 is supplied to the fault-tolerant clock system via a suitable isolation amplifier 24. In order to form the output signal, PAL 23 is supplied at its CLK input with a free running crystal clock signal (identified as CLK*) having a frequency of 6 MHz for the particular embodiment disclosed as discussed with reference to FIG. 1.

If the derived FTC majority clock input signal (M) is high (i.e., it has begun its cycle) before the selected time interval, i.e., one CLK* pulse width (i.e., 1/6 $\mu$sec) before the generated clock signal goes high to begin its cycle, then flip-flop 20 produces a "behind" control signal. Such control signal is supplied to PAL 23 which has been programmed to respond thereto so as to produce a generated clock output signal which is shortened by one CLK* pulse period and in which the dead interval is omitted, as shown by generated clock signal 17 of FIG. 2.

If neither of such conditions is present, i.e., the derived FTC clock signal changes state from low to high to begin its cycl during the selected time interval between strobes SA and SB, the programmable array logic is programmed to produce the normal generated clock signal having 23 CLK* pulses, together with normal dead interval 15, as shown by signal 18 of FIG. 2.

In summary, clock signal 16 is adjusted by providing 23 pulses out of 25 pulse periods in order to align the end of the generated clock signal period with the end of the derived FTC clock period when signal 16 is ahead of FTC clock signal (M) at the beginning of the clock period. The generated clock signal 17 comprises 23 pulses out of 23 pulse periods in order to provide a similar alignment when the signal 17 is behind the FTC clock signal at the beginning of the clock period. The generated clock signal 18 is the normal clock signal which has the same form as the derived FTC clock signal, i.e., 23 pulses out of 24 pulse periods, when the signals are in phase at the beginning of the clock period.

The flip-flop circuits can be any well known types available to those in the art, while the programmable array logic circuit may be of any well known type, for example, one manufactured under the model designation 16R6 as made and sold by Monolithic Memories, Inc. of Sunnyvale, Calif. The specific programming of such a programmable array logic circuit so as to produce the above operation would be well within the skill of thos in the art given the technique of the invention as discussed above.

I will be noted that if the generated clock signal is ahead of or behind the derived FTC clock signal by more than one CLK* pulse width, the circuitry of FIG. 3 will shorten or lengthen the current clock period by one CLK* pulse width in the first instance and then repeat the same operation at each subsequent clock period until the generated and derived clock signals become aligned, as described above. In effect, the generated clock signal is "stepped" forward or backward by a CLK* pulse width until alignment occurs and the signals are in phase.

Thus, the invention, as explained with reference to FIG. 2 and as implemented by the circuitry of FIG. 3, avoids the use of voltage controlled oscillators and can be implemented in a much less expensive manner than the circuitry previously used by the prior art, as described, for example, in the aforesaid Smith et al. patent. Moreover, the reliability of the circuitry shown in FIG. 3 tends to be greater than that of circuits which utilize VCO's.

While the particular embodiment of the invention for providing the desired operation thereof as described above would be clear to those in the art, modifications thereof may occur to those in the art within the spirit and scope of the invention. Hence the invention is not to be limited to the specific embodiment described except as defined by the appended claims.

What is claimed is:

1. A circuit for maintaining an output signal in phase with an input signal, said output signal and said input signal each comprising a plurality of pulses, said pulses having a frequency substantially higher than the frequency of said input and output signals, one pulse of said plurality of pulses being omitted in each cycle of said input and output signals to form a dead interval therein when said signals are in phase, said circuit comprising means responsive to said input signal and to said output signal for comparing the phase of said output signal relative to that of said input signal at the start of a cycle of each of said signals;

logic circuit means including means responsive to a said phase comparing means for controlling the length of cycle of the output signal when the output signal is not in phase with the input signal by omitting said dead interval to shorten said cycle when the phase of said output signal is behind that of said input signal and by inserting a second dead interval to lengthen said cycle when the phase of said output signal is ahead of that of said input signal.

2. A circuit in accordance with claim 1 wherein said logic circuit means further includes means for defining a selected time interval within which the start of a cycle of said output signal occurs; and said phase comparing means includes means for determining the start of a cycle of said input signal relative to said selected time interval.

3. A circuit in accordance with claim 2 wherein said phase comparing means further includes means for providing control signals indicating that the phase of said output signal is (1)ahead of said input signal when the start of said input signal occurs after said selected time interval or (2)behind that of said input signal when the start of said input signal occurs before said selected time interval;

said length controlling means being responsive to said control signals.

4. A circuit in accordance with claim 3 wherein said selected time interval defining means includes means for generating a pair of strobe pulses before and after, respectively, the start of a cycle of said output signal to define said selected time interval.

5. A circuit in accordance with claim 4 wherein said strobe pulses occur at substantially one pulse width before and one pulse width after, respectively, the start of a cycle of said output signal, said pulse width being defined in accordance with the frequency of the plurality of pulses of which said output signal is comprised.

6. A circuit in accordance with claim 5 wherein said control signals providing means is responsive to said strobe pulses and to said input signal for providing said control signals.

7. A fault-tolerant clock system including a plurality of circuits in accordance with claim 1, wherein the output signals from each of said plurality of circuits are used to derive a fault-tolerant clock signal which is supplied as the input signal to each of said circuits.

8. A fault-tolerant clock system in accordance with claim 7 wherein each of said circuits further includes a fixed clock generating means for producing said plurality of pulses having a fixed selected frequency which is higher than the frequency of said fault-tolerant clock signal.

9. A fault-tolerant clock system in accordance with claim 8 wherein said fixed selected frequency is at least an order of magnitude higher than the frequency of said fault-tolerant clock signal.

10. A method for maintaining an output signal in phase with an input signal, said signals comprising a plurality of pulses, one pulse being omitted in each cycle thereof to form a non-pulse interval when said signals are in phase, said method comprising the steps of comparing the phases of said input and output signals at the start of a cycle of each of said signals; and controlling the length of a cycle of said output signal by omitting said non-pulse interval when the phase of the output signal is behind that of the input signal and by inserting an additional non-pulse interval when the phase of the output signal is ahead of that of the input signal.

11. A method in accordance with claim 10 wherein said comparing step includes the steps of defining a selected time interval in which the start of a cycle of said output signal occurs; and determining the start of a cycle of said input signal relative to said selected time interval.

* * * * *